United States Patent Office 2,908,734
Patented Oct. 13, 1959

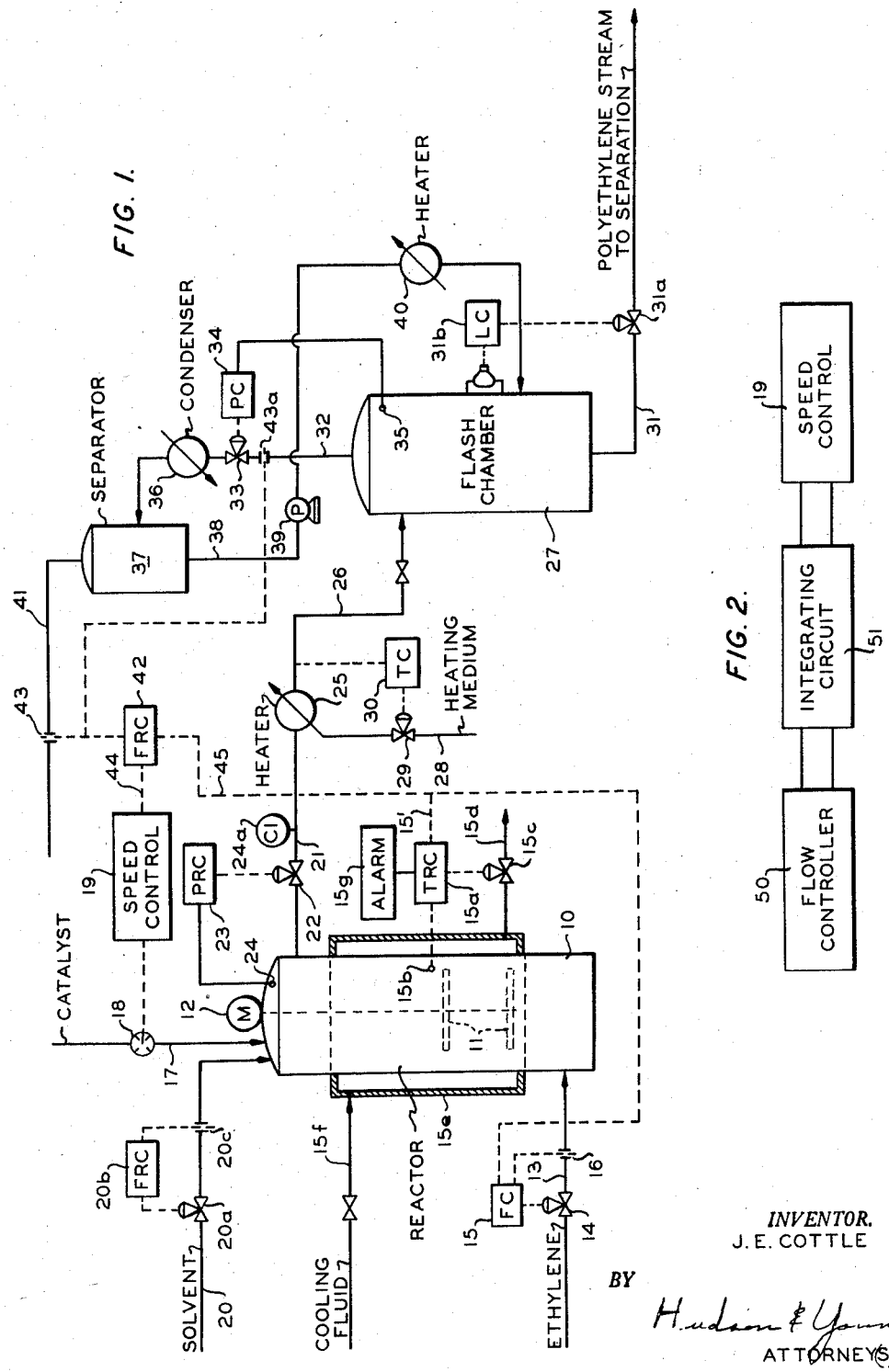

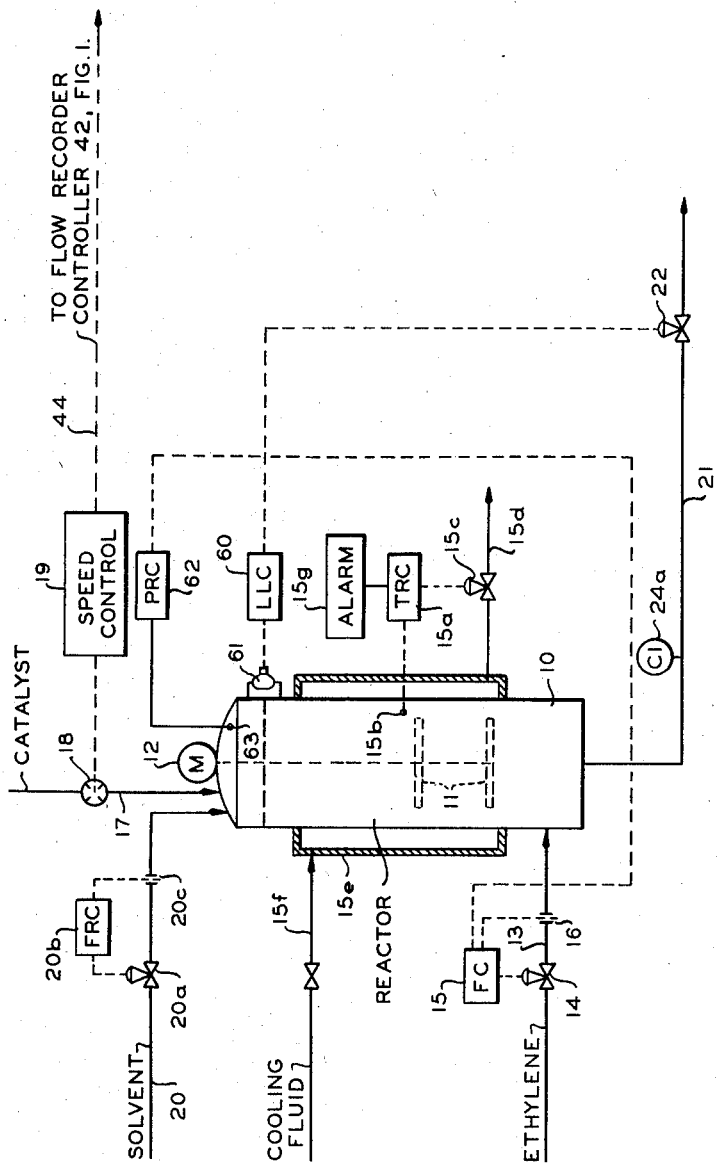

2,908,734
METHOD OF AND APPARATUS FOR CONTROLLING CATALYTIC PROCESSES

John E. Cottle, Bartlesville, Okla., assignor to Phillips Petroleum Company, a corporation of Delaware Application August 25, 1955, Serial No. 530,483

16 Claims. (Cl. 260—683.15)

This invention relates to a method of and apparatus for the control of a catalytic process.

In liquid phase catalytic processes, it is necessary to separate the unreacted feed from the reaction products. I have discovered that the rate of flow of unreacted feed from this separation step can be used very advantageously to control the proportions of feed and catalyst fed to the reaction zone so as to obtain maximum conversion and constant throughput in the system.

The control method and apparatus of the invention are particularly applicable to the liquid phase polymerization of 1-olefins having no more than 8 carbon atoms with no branching nearer the double bond than the four position, for example, ethylene, where such polymerization takes place in the presence of a granular polymerization catalyst.

In this process, the polyethylene and catalyst are separated from a stream containing substantially all the unreacted 1-olefin in a flash chamber, and the rate of flow of effluent gas from the flash system is advantageously utilized, in accordance with the invention, to control either the rate of flow of olefin to the reaction zone or the amount of catalyst fed to the reaction zone. I have further found that the effects of fluctuations in this flow rate can be minimized either by maintaining a constant pressure in the flash chamber or by integrating a control output representing the rate of flow of gaseous material from the flash system over a desired period of time, thus providing an efficient control action well adapted for commercial operation.

Accordingly, it is an object of the invention to provide an improved control system for liquid phase reactions conducted in the presence of a granular catalyst.

It is a further object to provide an improved control method for such systems.

It is a still further object to provide a control method and apparatus for the polymerization of specified 1-olefins and for separation of the polymerized product from the unreacted materials.

Various other objects, advantages and features of the invention will become apparent from the following detailed description taken in conjunction with the accompanying drawing, in which:

Figure 1 is a flow diagram of a process embodying the control system of this invention;

Figure 2 is a block diagram illustrating a feature of the invention; and

Figure 3 is a flow diagram of a modified process.

Referring now to Figure 1, I have shown a reactor 10 provided with an agitator or stirrer 11 driven by a motor 12. Connected to the reactor 10 is a feed line 13 incorporating a valve 14. This valve is under the control of a flow controller 15 having a sensing element 16 in the feed line 13. A granular catalyst is fed to the reaction zone through a line 17 under the control of a suitable solids control valve 18, such as a star valve, which is equipped with a speed controller 19. In many cases, the catalyst is dispersed in a solvent which is introduced through a line 20 having a motor valve 20a controlled by a flow recorder controller 20b which has a sensing element 20c in the line 20 downstream of the valve 20a.

Effluent is withdrawn from the reactor through a line 21 which incorporates a valve 22 connected to a pressure controller 23 which has a sensing element 24 disposed within the reactor. This valve regulates the rate of flow of effluent from the reactor so as to maintain a constant predetermined reactor pressure.

A concentration indicator 24a is connected to the line 21 to show the polymer concentration in the reactor effluent.

The effluent line 21 then passes through an indirect heat exchanger 25 and a valved line 26 to a flash chamber 27. A heating medium enters the unit 25 through a line 28 and a valve 29 which is connected to temperature controller 30 having a sensing element in the line 26. Thus, the controller 30 regulates the amount of heating medium fed to unit 25 to maintain a constant predetermined temperature of the effluent entering the flash chamber 27.

From the flash chamber 27, reaction product is withdrawn through a line 31, this reaction product stream including the granular catalyst and the solvent, if one is employed, while a vapor stream containing the unreacted feed passes overhead through a line 32. A valve 31a in the line 31 causes a predetermined level to be maintained in the vessel 27 by the action of a level controller 31b having a sensing element in the vessel. A valve 33 is disposed in the line 32, and this valve is connected to a pressure controller 34 having a sensing element 35 in the chamber 27 so that the valve 33 regulates the flow of gas from the chamber 27 to maintain a constant pressure therein. If desired the sensing element 35 can be located in the line 32 upstream of the valve 33.

The gaseous material from the flash chamber then passes through a condenser 36 to a separator or knockout drum 37 from which liquid is withdrawn through a line 38 and passed through pump 39 and a heater 40 to the flash chamber 27.

An overhead gas stream is taken from the separator to a line 41, this stream containing substantially all the unreacted feed material.

In accordance with the invention, a flow controller 42 has a sensing element 43 in the conduit 41 or, if desired, a sensing element 43a in the line 32. This controller produces a control output which is a function of the rate of flow of gas through the conduit 41. This output is applied either, as indicated by dashed line 44, to an actuating or settable element of the speed controller 19 or, as indicated by dashed line 45, to an actuating or settable element of the flow controller 15. In either event, the flow controller regulates the relative proportions of catalyst and feed fed to the reactor 10 so as to maintain a constant flow of gaseous material, principally unreacted feed, through the conduit 41. Depending upon the setting of controller 42, the process can be controlled to maintain a minimum amount of unreacted material in the reactor effluent. In any event, a constant throughput is maintained through the system.

Thus, assuming that the flow controller 42 is connected to speed controller 19 and not to flow controller 15, the rate of flow of feed to the reactor can be maintained substantially constant.

In such instance, the output of the flow controller 15 can be advantageously utilized as indicated by line 15′ to set a temperature recorder controller which has a sensing element 15b in the reactor and controls a valve 15c in a coolant outlet line 15d connected to a jacket 15e to which cooling fluid is supplied by a valved line 15f. This maintains a predetermined relation between feed rate and reactor temperature. An alarm 15g is actuated if the reactor temperature rises above a predetermined value. For example, flow controller 15 can be reset to lower the feed rate if the reactor temperature becomes too high.

Should the activity of the catalyst decline, the conversion drops, and a greater amount of unreacted material is present in the line 41 leading from the separation system. Consequently, speed controller 19 is actuated to increase the amount of catalyst fed to the reactor so that the conversion is restored to its previous level. An increase in activity of the catalyst produces an opposite effect, namely, an increased conversion with resulting diminution in the amount of unreacted material passing through the line 41. This causes the rate of flow of catalyst to be decreased, and the amount of material converted to be restored to its original level.

Assuming now that the flow controller 42 is connected to flow controller 15 and not to speed controller 19, catalyst is fed to the reactor 10 at a constant rate. Again, should the activity of the catalyst increase, the conversion is increased, and less unreacted material flows through line 41. As a result, flow controller 42 resets flow controller 15 to increase the amount of feed to the reactor and thus restore the predetermined flow of unreacted material through the conduit 41. Conversely, a decrease in catalyst activity causes an increase in the amount of unreacted material fed to line 41 with the result that the flow controller 15 is reset to decrease the feed to reactor 10.

It will further be apparent that other changes in operating variables of the system than catalyst activity will be corrected by the control system of the invention.

In some cases, in commercial operation, difficulties are encountered due to surging in the separation system. These difficulties are effectively eliminated by the pressure controller 34 which regulates the rate of flow through the separator 37 and conduit 41 in such fashion as to maintain constant pressure in the flash chamber 27.

Alternatively, if such surges are present, the effect upon the operation of the control system can be eliminated by integrating or averaging the output of flow controller 42 over a predetermined period of time. Such a system is illustrated by Figure 2 wherein a flow controller 50 is provided which produces an electrical output representative of the velocity of flow through the conduit 41. The electrical output of the controller 50 is fed to an integrating circuit 51 which, in turn, produces an electrical output responsive to the average output of controller 50 taken over a predetermined interval of time. This integrated output is applied to the speed controller 19, or alternatively, to the flow controller 15 of Figure 1, thus providing a very advantageous smoothing action, and eliminating the effect of surges in the separation system upon smooth, continuous operation of the control system.

The flow controllers, integrating circuits, and speed controls described in the foregoing discussion are standard control instruments well known to those skilled in the art of process control instrumentation. The details and structure of these instruments per se form no part of the present invention. Suitable flow controllers include those described in Bulletin 427–1 (August 1950) of the Foxboro Company, especially page 17, and those described in Catalog No. 15–13 (1948), especially page 16, of the Brown Instrument Company. An example of a suitable integrating circuit is illustrated in "The Electronic Control Handbook," by Batcher and Moulic, published by Caldwell-Clements Incorporated, New York, 1946, page 219, at paragraph 43. A suitable speed control is illustrated in the same handbook on page 278, paragraph 32. These examples do not exhaust the possibilities. Other specific instruments are well known and can be readily supplied or substituted by those skilled in the art.

Although, as indicated, the control method and apparatus are applicable generally to liquid phase reactions involving a granular catalyst, they have special importance and application to polymerization reactions of 1-olefins containing no more than 8 carbon atoms and having no branching nearer the double bond than the 4 position. As an example of a specific process of this type, can be mentioned the polymerization of ethylene with a chromium oxide catalyst supported on silica, alumina, or silica-alumina. In this system, the feed is ethylene of 95% purity containing small quantities of impurities such as methane, ethane or carbon dioxide. This material is fed at a rate of 14.6 cubic feet per hour to the reactor together with one gallon per hour of isooctane diluent introduced through line 20 together with sufficient catalyst to maintain 0.1 to 0.5, specifically 0.3 weight percent catalyst in the effluent. The reactor was operated at a temperature of 285° F. and a pressure of 500 pounds per square inch gage, the effluent being heated to a temperature of 325° F. by the heater 25. The reactor effluent contains 0.3 weight percent catalyst, 6.5 weight percent polyethylene, 6.5% ethylene, 0.7% light gaseous impurities and 86.0% solvent. A pressure of 100 pounds per square inch gage is maintained in the flash chamber 27 and a pressure of 90 pounds per square inch gage is maintained in the separator 37, the condensate entering the separator 37 at a temperature of 100° F. A back pressure is maintained on the heater 25 in any suitable manner, for example, by a pressure regulator connected to the valve in line 26 just upstream of the flash chamber 27.

Under these conditions, the bottoms product of the flash chamber contains 0.3% catalyst, 6.9% polymer, 1.1% ethylene, 0.1% light gaseous impurities, and 91.6% solvent. Offgas was withdrawn from the separator 37 at a rate of 6.7 standard cubic feet per hour which was the control point of flow controller 42. This gas had a composition of 81% ethylene, 10% solvent and 9% light gaseous impurities. The offgas rate was readily maintained at 6.6 to 6.8 standard cubic feet per hour through the operation of the control system either when connected to the catalyst valve 18 or the flow control valve 14 on the ethylene feed line, and very smooth operation of the process was obtained, as contrasted with a considerable variation in offgas rate, and considerable loss of ethylene when the control system of the invention was not employed.

It will be understood, of course, that the invention is not to be limited to the specific example given, even in its very advantageous application to the control of the polymerization of 1-olefins having no more than 8 carbon atoms with no branching nearer the double bond than the four position. For example, the polymerization of olefins such as propylene, 1-octene, can be advantageously controlled by the system of this invention, and in some cases the polymerization of diolefins or conjugated diolefins of no more than 8 carbon atoms can be advantageously controlled.

Further, various polymerization catalysts can be used, and various materials, such as thoria and zirconia are suitable as supports and have catalytic activity. Additional promoters such as zinc oxide, magnesium oxide, strontium oxide, and the like can be employed. Further, various solvents can be utilized provided that they do not impair the activity of the catalyst. Thus, aliphatic and alicyclic hydrocarbons of 3 to 12 carbon atoms preferably 5 to 12 carbon atoms per molecule are suitable, specifically propane, normal butane, cyclohexane, methylcyclohexane and isooctane.

Finally, the reaction temperatures, pressures and feed rates can be varied, a range of 150 to 450° F. being used for the recited 1-olefins generally with a preferred range for propylene of 150 to 250° F. and for ethylene of 275 to 375° F., with a pressure varying from atmospheric to 700 pounds per square inch gage or higher.

Referring now to Figure 3, I have shown a modified control system as applied to a reactor of the so-called gas cap type. In this figure, parts corresponding to those of Figure 1 are indicated by like reference numerals.

In this reactor, a predetermined liquid level is maintained by a level controller 60 having a sensing element 61 within the reactor 10, this controller being connected to the motor valve 22 in the effluent withdrawal line 21. Thus, the liquid within the reactor is maintained at a predetermined level and there is a gas space above this liquid level. Also, a pressure recorder controller 62 has a sensing element 63 within the gas phase of the reactor, and this pressure controller is connected so as to set the flow recorder controller 15. Thus, the rate of flow of ethylene into the reactor is regulated so as to maintain a constant predetermined pressure therein. Otherwise, with this modification, the operation is as described in Figure 1 in that the controller 19 regulating the rate of catalyst flow is connected by connection 44 to the flow recorder, not shown, in the effluent line from the flash system, as previously described in connection with Figure 1.

While the invention has been described in connection with present, preferred embodiments thereof, it is to be understood that this description is illustrative only and is not intended to limit the invention.

I claim:

1. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the separated unreacted component from the separation zone, producing a control output which varies with the rate of flow of unreacted 1-olefin from the separation zone, and varying the ratio of catalyst to feed in accordance with the magnitude of said control output, thereby to maintain constant the amount of unreacted feed present in said effluent.

2. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the separated unreacted component from the separation zone, producing a control output which varies with the rate of flow of unreacted 1-olefin from said separation zone, and controlling the rate of flow of feed to said reaction zone in accordance with the magnitude of said control output while maintaining the rate of flow of catalyst to said reaction zone at a substantially constant value, thereby to maintain constant the amount of unreacted feed in said effluent.

3. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the separated unreacted component from the separation zone, producing a control output which varies with the rate of flow of unreacted 1-olefin from said separation zone, and controlling the rate of flow of catalyst to said reaction zone in accordance with the magnitude of said control output while maintaining the rate of feed to said reaction at a substantially constant value, thereby to maintain constant the amount of unreacted feed present in said effluent.

4. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the separated unreacted component from the separation zone, producing a control output which varies with the rate of flow of unreacted 1-olefin from said separation zone, and varying the ratio of catalyst to feed in accordance with the magnitude of said control output, thereby to maintain constant the amount of unreacted feed present in said effluent, and maintaining a substantially constant pressure in said separation zone to smooth out the flow of unreacted 1-olefin therefrom.

5. The method of claim 1 wherein the reaction zone is maintained liquid full.

6. The method of claim 1 wherein the reaction zone is partially filled with liquid and a gaseous phase occupies the remainder of the reaction zone above the liquid phase therein.

7. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the separated unreacted component from the separation zone, producing a control output which varies with the rate of flow of unreacted 1-olefin from said separation zone, varying the ratio of catalyst to feed in accordance with the magnitude of said control output, thereby to maintain constant the amount of unreacted feed present in said effluent, and integrating said control output to produce an output which varies in accordance with the average value of the rate of flow of said unreacted 1-olefin taken over a predetermined time interval.

8. The process of claim 1 wherein the 1-olefin is ethylene and the catalyst is chromium oxide supported on a carrier selected from the group consisting of silica, alumina and silica-alumina.

9. The method of controlling the polymerization of a 1-olefin having no more than 8 carbon atoms with no branching nearer the double bond than the four position, wherein said one-olefin is fed to a reaction zone and polymerized in the presence of a granular polymerization catalyst fed to the reaction zone in a slurry with a hydrocarbon solvent, the effluent is introduced to a flash separation zone wherein a liquid polymer-containing stream is separated from a gaseous stream containing unreacted 1-olefin, the gaseous stream is partially condensed and fed to a liquid-vapor separation zone, the liquid from said separator zone being returned to said flash zone and the vapor from said separator zone being withdrawn through an overhead conduit, the steps which comprise measuring the rate of flow of said vapor through said overhead conduit, producing a control output proportional to the rate of flow of vapor through the said overhead conduit, and controlling the ratio of catalyst and 1-olefin fed to said reaction zone in accordance with the magnitude of said control output, thereby to maintain constant the amount of unreacted 1-olefin in the effluent from said reaction zone.

10. The method of controlling the polymerization of a 1-olefin having no more than 8 carbon atoms with no branching nearer the double bond than the four position, wherein said 1-olefin is fed to a reaction zone and polymerized in the presence of a granular polymerization catalyst fed to the reaction zone in a slurry with a hydrocarbon solvent, the effluent is introduced to a flash separation zone wherein a liquid polymer-containing stream is separated from a gaseous stream containing unreacted 1-olefin, the gaseous stream is partially condensed and fed to a liquid-vapor separation zone, the liquid from said separator zone being returned to said flash zone and the vapor from said separator zone being withdrawn through an overhead conduit, measuring the rate of flow of said vapor through said overhead conduit, producing a control output directly proportional to the rate of flow of vapor through said overhead conduit, and controlling the rate of flow of said 1-olefin to the reaction zone in accordance with the magnitude of said control output while maintaining the rate of catalyst addition at a substantially constant value, thereby to maintain constant the amount of unreacted 1-olefin present in the effluent from said reaction zone.

11. In a process for controlling the polymerization of ethylene wherein ethylene is introduced into a reaction zone and therein contacted with a granular chromium oxide-containing catalyst dispersed in a slurry of hydrocarbon material selected from the class consisting of paraffins and cycloparaffins, the effluent from the reaction zone is heated and passed to a flash zone wherein a polyethylene stream is separated from a vaporous stream containing unreacted ethylene, said vaporous stream being partially condensed and fed to a liquid-vapor separation zone, the liquid from which is returned to the flash zone and the vapor from which is withdrawn through an outlet conduit, the steps which comprise measuring the rate of flow of said vapor through said outlet conduit, producing a control output proportional to the rate of flow of gas through said outlet conduit, and varying the amount of catalyst fed to said reaction zone in accordance with the magnitude of said control output while maintaining a substantially constant rate of flow of ethylene to the reaction zone, thereby to maintain constant the amount of unreacted ethylene present in the effluent from said reaction zone.

12. In a process for controlling the polymerization of ethylene wherein ethylene is introduced into a reaction zone and therein contacted with a granular chromium oxide-containing catalyst dispersed in a slurry of hydrocarbon material selected from the class consisting of paraffins and cycloparaffins, the effluent from the reaction zone is heated and passed to a flash zone wherein a polyethylene stream is separated from a vaporous stream containing unreacted ethylene, said vaporous stream being partially condensed and fed to a liquid-vapor separation zone, the liquid from which is returned to the flash zone and the vapor from which is withdrawn through an outlet conduit, the steps which comprise measuring the rate of flow of said vapor through said outlet conduit, producing a control output proportional to the rate of flow of gas through said outlet conduit, maintaining a substantially constant pressure in said reaction zone and said flash zone, integrating said control output to produce an electrical voltage proportional to the average value of flow through said outlet conduit taken over a predetermined interval of time and varying the amount of catalyst fed to said reaction zone in accordance with the magnitude of said integrated control output while maintaining a substantially constant rate of flow of ethylene to the reaction zone, thereby to maintain constant the amount of unreacted ethylene present in the effluent from said reaction zone.

13. A control system for a polymerization plant including a reactor, a feed line connected to said reactor, a rate of flow controller connected to said feed line having a control element, a catalyst introduction line connected to said reactor having a valve therein controlling the introduction of granular catalyst to said reactor, a control element connected to said valve and controlling the operation thereof, a flash chamber, an effluent line connecting said reactor to said flash chamber, a separator vessel, a line including a condenser connecting the top of said flash chamber to said separator vessel, an overhead conduit connected to said separator vessel, a rate of flow controller connected in said overhead conduit and producing an output representative of the flow therethrough, and means applying said output to one of said control elements.

14. The method of controlling the polymerization of a 1-olefin having no more than 8 carbon atoms with no branching nearer the double bond than the four position, wherein said 1-olefin is polymerized in liquid phase in a reaction zone in the presence of a granular polymerization catalyst continuously fed to said reaction zone, and the effluent from the reaction zone is separated, in a separation zone, into a polymer fraction and a fraction containing unreacted 1-olefin, the steps which comprise measuring the rate of flow of the latter-mentioned fraction from said separation zone, producing a control output which varies with the rate of flow of unreacted 1-olefin from the separation zone, controlling the ratio of catalyst and 1-olefin fed to said reaction zone in accordance with the magnitude of said control output, passing a cooling medium in indirect heat exchange relationship with the reaction zone, and regulating the amount of cooling medium thus passing in indirect heat exchange relationship to maintain the reactor temperature at a preassigned value.

15. A control system for a polymerization plant including a reactor, a feed line connected to said reactor, a rate of flow controller connected to said feed line having a control element, a catalyst introduction line connected to said reactor and having a valve therein controlling the introduction of catalyst into said reactor, a control element connected to said valve and controlling the operation thereof, a flash chamber, an effluent line connecting said reactor to said flash chamber, a conduit for withdrawing reaction product from said flash chamber, conduit means in communication with a vapor space in said flash chamber, a rate of flow controller connected to the last-mentioned conduit means and producing an output representative of the flow therethrough, and means applying said output to one of said control elements.

16. In the process of continuously polymerizing polymerizable monomers in the presence of a polymerization catalyst fed continuously in the polymerization zone wherein the reactor effluent comprises ploymer and unreacted monomers, the improvement comprising separating said effluent, in a separation zone, into a polymer fraction and a fraction containing said unreacted monomers, measuring the rate of flow of the separated unreacted monomers from the separation zone, producing a control output which varies with the rate of flow of unreacted monomers from the separation zone, and varying the ratio of catalyst to feed in accordance with the magnitude of said control output thereby maintaining constant the amount of unreacted feed present in said effluent.

References Cited in the file of this patent

UNITED STATES PATENTS

| | | |
|---|---|---|
| 2,373,888 | Hachmuth | Apr. 17, 1945 |
| 2,462,995 | Ritzmann | Mar. 1, 1949 |
| 2,518,307 | Groebe | Aug. 8, 1950 |
| 2,606,940 | Bailey et al. | Aug. 12, 1952 |
| 2,731,452 | Field et al. | Jan. 17, 1956 |
| 2,792,501 | Barton | May 14, 1957 |